(12) United States Patent
Myers, III et al.

(10) Patent No.: US 10,694,455 B2
(45) Date of Patent: Jun. 23, 2020

(54) CONNECTIVITY STATE OPTIMIZATION TO DEVICES IN A MOBILE ENVIRONMENT

(71) Applicant: Ayla Networks, Inc., Santa Clara, CA (US)

(72) Inventors: Daniel J. Myers, III, Fremont, CA (US); Rajalakshmi Ramachandran Pillay, Sunnyvale, CA (US); Brian King, Sunnyvale, CA (US)

(73) Assignee: Ayla Networks, Inc., Santa Clara, CA (US)

( * ) Notice: Subject to any disclaimer, the term of this patent is extended or adjusted under 35 U.S.C. 154(b) by 40 days.

(21) Appl. No.: 15/869,982

(22) Filed: Jan. 12, 2018

(65) Prior Publication Data

US 2019/0007949 A1   Jan. 3, 2019

Related U.S. Application Data (60) Provisional application No. 62/526,929, filed on Jun. 29, 2017.

(51) Int. Cl.
*H04W 48/18* (2009.01)
*H04W 36/24* (2009.01)
(Continued)

(52) U.S. Cl.
CPC .......... *H04W 48/18* (2013.01); *H04L 45/22* (2013.01); *H04W 36/14* (2013.01);
(Continued)

(58) Field of Classification Search
CPC ..... H04W 48/18; H04W 36/03; H04W 36/06; H04W 36/08; H04W 36/14;
(Continued)

(56) References Cited

U.S. PATENT DOCUMENTS

2001/0056503 A1  12/2001  Hibbard
2011/0300865 A1* 12/2011  Kashikar ............... H04W 48/18
                                            455/435.2

(Continued)

OTHER PUBLICATIONS

Extended European Search Report for European Patent Application No. 18180902.1 dated Aug. 22, 2018, 13 pages.

*Primary Examiner* — Joshua Kading
(74) *Attorney, Agent, or Firm* — Lowenstein Sandler LLP (57) ABSTRACT

A method includes establishing, by a processing device of a first device, a first connection with a second device. The first connection including a first connection type. The method includes detecting a network change event. The network change event including a change in connection status of at least one of the first connection type or a second connection type. The method includes determining an available connection type having a highest rank responsive to detecting the network change event. In response to a determination that the available connection type having the highest rank is the second connection type or a third connection type, the method includes establishing a second connection with the second device. The second connection including the available connection type having the highest rank. The method includes communicating with the second device using the available connection type having the highest rank via the second connection.

20 Claims, 8 Drawing Sheets

(51) Int. Cl.

| | | |
|---|---|---|
| *H04W 36/14* | (2009.01) | |
| *H04W 76/10* | (2018.01) | |
| *H04W 76/20* | (2018.01) | |
| *H04W 36/30* | (2009.01) | |
| *H04W 36/16* | (2009.01) | |
| *H04W 36/36* | (2009.01) | |
| *H04W 40/24* | (2009.01) | |
| *H04L 12/707* | (2013.01) | |
| *H04W 40/34* | (2009.01) | |
| *H04W 76/25* | (2018.01) | |
| *H04W 76/15* | (2018.01) | |
| *H04W 88/06* | (2009.01) | |
| *H04L 12/54* | (2013.01) | |

(52) U.S. Cl.
 CPC ......... *H04W 36/165* (2013.01); *H04W 36/24* (2013.01); *H04W 36/30* (2013.01); *H04W 36/305* (2018.08); *H04W 36/36* (2013.01); *H04W 40/24* (2013.01); *H04W 40/34* (2013.01); *H04W 76/10* (2018.02); *H04W 76/20* (2018.02); *H04W 76/25* (2018.02); *H04L 12/5691* (2013.01); *H04W 76/15* (2018.02); *H04W 88/06* (2013.01)

(58) Field of Classification Search
 CPC ... H04W 36/165; H04W 36/24; H04W 36/28; H04W 36/30; H04W 36/36; H04W 76/15; H04W 76/20; H04W 76/30; H04W 88/06; H04L 12/5691
 See application file for complete search history.

(56) References Cited

U.S. PATENT DOCUMENTS

| | | | |
|---|---|---|---|
| 2012/0264444 A1 | 10/2012 | Yu | |
| 2013/0258870 A1* | 10/2013 | Macias | H04W 48/18 370/252 |
| 2015/0188971 A1* | 7/2015 | Yoon | H04L 67/20 709/219 |
| 2015/0373633 A1* | 12/2015 | Chhabra | H04W 48/18 455/435.2 |
| 2016/0072674 A1 | 3/2016 | Nolan et al. | |
| 2016/0182111 A1 | 6/2016 | Ratiney et al. | |
| 2016/0277917 A1* | 9/2016 | Pirila | H04W 48/18 |
| 2017/0127330 A1* | 5/2017 | Payyappilly | H04W 24/10 |
| 2017/0181027 A1* | 6/2017 | Raleigh | H04W 48/18 |

* cited by examiner

CONNECTIVITY STATE OPTIMIZATION TO DEVICES IN A MOBILE ENVIRONMENT

RELATED APPLICATIONS

This patent application claims the benefit under 35 U.S.C. § 119(e) of U.S. Provisional Application No. 62/526,929, filed Jun. 29, 2017, which is herein incorporated by reference.

BACKGROUND

There are numerous ways to connect various devices with embedded systems to computing devices. For example, a device with an embedded system (e.g., smart appliance) may connect to a computing device (e.g., smartphone) directly via a local area network (LAN), Bluetooth, ZigBee, or the like. Also, the device with an embedded system may connect to the computing device indirectly via a wide area network (WAN) service available in a cloud-based environment. Oftentimes, once the connection is established between the devices with embedded systems and the computing devices, the connection does not change to a different connection. However, some of the connections established between the devices may include one or more drawbacks related to latency, bandwidth, security, and so forth.

BRIEF DESCRIPTION OF THE DRAWINGS

Reference will now be made to the accompanying drawings showing example embodiments of the present application, and in which.

DESCRIPTION OF EXAMPLE EMBODIMENTS

Embodiments are directed to automatically identifying the optimal means to connect a computing device to a device having an embedded system and establishing a connection using the identified means. In some embodiments, the computing device may be a mobile device (e.g., smartphone) and the connection to the device may be made in a mobile environment (e.g., may be a wireless connection). The computing device may include a remote control application and a device manager application. The remote control application may be used to monitor and/or control the device from the computing device. An instance of the remote control application associated with the device may be included in the device manager application. The device manager application may generate a virtual representation of each device to which the computing device is connected. The virtual representation may access various device data and/or operations included in the remote control application for the device. The device manager application may use the virtual representation of the device to automatically control which connection is established and used for communication between the computing device and the device.

In some embodiments, the device manager application running on the computing device may dynamically establish and use a connection with the device having an embedded system where the connection includes an available connection type having a highest rank. The device manager application is capable of detecting network change events for each available connection type for the device connected to the computing device. A network change event may refer to a change in connection status of a connection type for the connected device. The connection types may include a local area network (LAN) session, a wide area network (WAN) accessible service (e.g., a web service or "cloud" service), a cellular network, Bluetooth®, Zigbee®, or the like. Once a network change event is detected, the device manager application may determine an available connection type having a highest rank. The device manager application may establish a new connection with the device where the new connection has the available connection type having the highest rank. Alternatively, if the connection type having the highest rank corresponds to a current connection, then the current connection may be maintained.

It should be understood that the device manager application may be managing the connections between the computing device and numerous devices each having different connection types independently from each other. Further, there may be numerous (e.g., 2, 3, 4, 5, 6, etc.) available connection types for each device at certain times. Accordingly, in some embodiments, a ranked list of connection types may be maintained by the device manager application for each device. The ranked list may be used when determining which connection type to select to establish a new connection to the devices in response to network change event indicating the numerous connection types are available.

To illustrate, the computing device may be a smartphone included on a user's person (e.g., pocket) and may move out of range of a LAN that is being used to connect to the device (e.g., an appliance). The device manager application may receive one or more network change events indicating that the LAN is no longer available but a WAN accessible service may be available. The device manager application may inspect the ranked list to determine that the WAN accessible service has a highest rank of available connection types and may automatically establish a connection with the device via the WAN accessible service.

When the smartphone enters range of the LAN again, the device manager application may detect one or more network change events that indicate that the LAN is available and the WAN accessible service is also available. The device manager application may inspect the ranked list and determine that the LAN has the highest rank and automatically connect with the device via the LAN. It should be understood that the same techniques may be used when the device with the embedded system is moved. For example, a wearable, such as a smartwatch, may leave range of a LAN and the smartphone may detect one or more network change events that indicate that the LAN is unavailable and a Bluetooth connection type is available. In such a case, the smartphone may establish a connection to the smartwatch using the Bluetooth connection type if it is the highest ranked available connection type.

Some connection types may be ranked higher than other options due to one or more characteristic (e.g., latency, bandwidth, security, etc.). For example, a direct LAN connection may have a high ranking because it may provide reduced latency between receiving user commands at the remote control application and implementing those commands by the device. An indirect connection via the WAN accessible service may have a ranking lower than the direct LAN because the WAN accessible service is not a direct connection type. Accordingly, the automatic identification of an optimal available connection type in view of network change events and establishment of the identified connection type enhances a user experience, minimizes latency, maximizes security, and so on.

Figure 1:
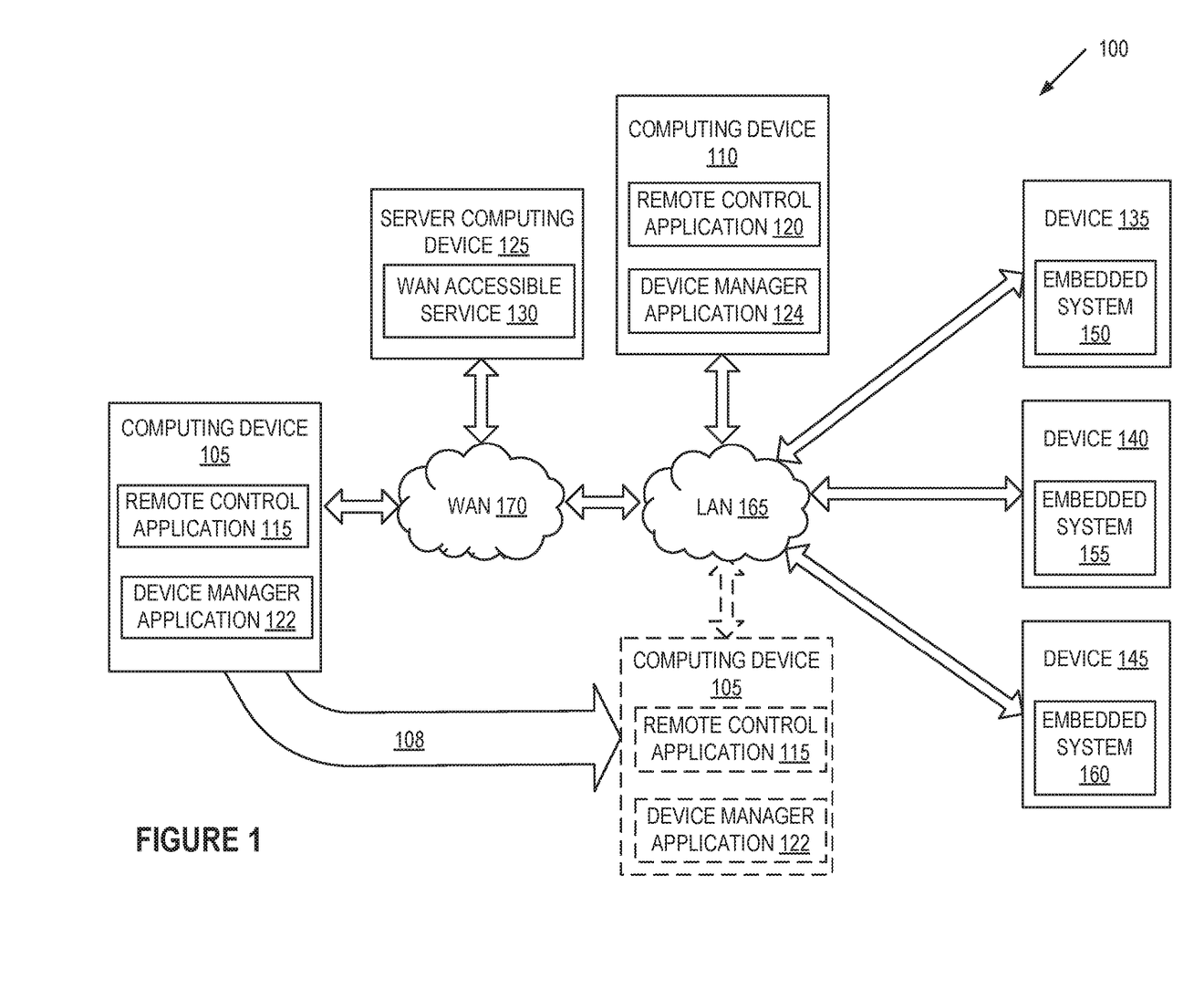
FIG. 1 is a block diagram depicting an example network architecture including remotely accessible embedded systems.

Referring now to the figures, FIG. 1 is a block diagram depicting an example network architecture 100 including remotely accessible embedded systems and computing devices that interact with the embedded systems. The network architecture 100 includes multiple devices 135, 140, 145 and computing devices 105-110 connected to a local area network (LAN) 165. The devices 135-145 are devices with embedded systems 150-155, 160, and may include, for example, electrical appliances such as refrigerators, ovens, washers, driers, dishwashers, thermostats, alarms, air conditioners, televisions, radios, receivers, amplifiers, and so forth. The devices 135-145 may also include consumer devices such as digital watches, music players, game consoles, digital cameras, printers, and so forth. Other examples of devices 135-145 include stationary devices such as HVAC systems, traffic lights, factory controllers, signs, electronic billboards, sprinkler systems, and irrigation control systems, as well as medical devices. Devices 135-145 may also be any other type of device that includes an embedded system 150, 155, 160.

An embedded system 150-160 is a class of computing device that is embedded into another device 135-145 as one component of the device 135-145. The device 135-145 typically also includes other hardware, electrical and/or mechanical components that may interface with the embedded system. Embedded systems 150-160 are typically configured to handle a particular task or set of tasks, for which the embedded systems 150-160 may be optimized. Accordingly, the embedded systems 150-160 may have a minimal cost and size as compared to general computing devices.

The embedded systems 150-160 may each include a communication module (not shown) that enables the embedded system 150-160 (and thus the device 135-145) to connect to the LAN 165. The communication module may be configured to manage security, manage sessions, manage communications with external devices, and so forth. In one embodiment, the communication module is configured to communicate using WiFi®. Alternatively, the communication module may be configured to communicate using Bluetooth, Zigbee, Internet Protocol version 6 over Low power Wireless Area Networks (6LowPAN), power line communication (PLC), Ethernet (e.g., 10 Megabyte (Mb), 100 Mb and/or 1 Gigabyte (Gb) Ethernet) or other communication protocols.

The LAN 165 may include a router, switch, bridge or other network device (not shown) that enables communication between multiple devices (e.g., devices 135-145, computing device 110, computing device 105, etc.) connected to the LAN 165. The network device may provide wired connections to the LAN using, for example, Ethernet ports, universal serial bus (USB) ports and/or Firewire® ports. The network device may additionally provide wireless connections to the LAN using, for example, a WiFi transceiver.

Some embedded systems 150 may not support any of the communication types supported by the network device. For example, device 135 may support Zigbee, and device 140 may support Bluetooth. To enable such devices to connect to the LAN 165, the LAN 165 may include a gateway device (not shown) connected to the network device via one of the connection types supported by the network device (e.g., via Ethernet or WiFi). The gateway device may additionally support other communication protocols such as Zigbee, PLC and/or Bluetooth, and may translate between supported communication protocols. Accordingly, some devices 135-145 may connect to the LAN through the gateway device.

The LAN 165 is connected to a wide area network (WAN) 170. The WAN 170 may be a private WAN (e.g., an intranet) or a public WAN such as the Internet, or may include a combination of a private and public network. The LAN 165 may include a router and/or modem (e.g., a cable modem, a direct serial link (DSL) modem, a Worldwide Interoperability for Microwave Access (WiMAX®) modem, an long term evolution (LTE®) modem, etc.) that provides a connection to the WAN 170.

The WAN 170 may include or connect to a server computing device 125. The server computing device 125 may include a physical machine and/or a virtual machine hosted by a physical machine. The physical machine may be a rackmount server, a desktop computer, or other computing device. In one embodiment, the server computing device 125 includes a virtual machine managed and provided by a cloud provider system. Each virtual machine offered by a cloud service provider may be hosted on a physical machine configured as part of a cloud. Such physical machines are often located in a data center. The cloud provider system and cloud may be provided as an infrastructure as a service (IaaS) layer. One example of such a cloud is Amazon's® Elastic Compute Cloud (EC2®).

The server computing device 125 hosts a WAN accessible service 130, which may be a web based service and/or a cloud service (e.g., a web based service hosted in a cloud computing platform). The WAN accessible service 130 may maintain a session (e.g., via a continuous or intermittent connection) with one or more of the embedded systems 150-160. Alternatively, the WAN accessible service 130 may periodically establish sessions with the embedded systems 150-160. Via a session with an embedded system 150-160, WAN accessible service 130 may issue commands to the embedded system and/or receive status updates from the embedded system. The commands may be commands to change a state of one or more parameters of a device controllable by the embedded system. For example, if the embedded system is embedded in a heater or thermostat, then the commands may include commands to increase or decrease a temperature. In another example, if the embedded system is embedded in a home automation system, then the commands may include commands to turn on or off lights.

Status updates received from the embedded systems 150-160 may identify values or states of some or all detectable parameters of devices 135-145 that the embedded systems are included in. Such values or states may change based on direct user interaction with the devices. Such values or states may also change responsive to commands sent to the embedded systems 150-160 by the WAN accessible service 130 and/or by computing devices 105, 110. By maintaining or periodically establishing sessions with the embedded systems 150-160, the WAN accessible service 130 may maintain up-to-date information on the states of the devices 135-145.

Computing devices 105, 110 may include portable devices such as electronic book readers, portable digital assistants, mobile phones, laptop computers, portable media players, tablet computers, cameras, video cameras, netbooks, notebooks, and the like. Computing devices 105, 110 may also include traditionally stationary devices such as desktop computers, gaming consoles, digital video disc (DVD) players, media centers, and the like.

Computing devices 105, 110 may connect to the embedded systems 150-160 via the WAN 170 (e.g., via the WAN accessible service 130), via the LAN 165, via a cellular network, via another WAN or LAN, via Bluetooth, via Zigbee, or via any suitable connection type based on what the highest ranked available connection type is at any particular point in time. The connection may change dynamically as the available connection types change in view of network change events received by the computing device 105, 110. For example, computing devices 105, 110 may connect to the LAN 165 when they enter a proximity to the LAN 165 sufficient to exchange data with a network device associated with the LAN 165 and the LAN 165 is ranked as the highest available connection type. In such a case, the computing devices 105, 110 may communicate with the devices 135-145 using the LAN 165.

Computing devices 105, 110 each include a remote control application 115, 120 and a device manager application 122, 124. The remote control application 115, 120 is configured to interface with and/or control one or more of the devices 135-145 via the devices' embedded systems 150-160. In one embodiment, the computing devices 105, 110 include separate remote control applications for each of the embedded systems 150-160. Alternatively, the computing devices 105, 110 may include a single remote control application that is capable of communicating with and controlling embedded systems 150-160 for multiple different devices 135-145.

The device manager applications 122, 124 may maintain an instance of each of the respective remote control application 115, 124 for connected devices 135-145. The instances may include virtual representations of the connected devices 135-145. As such, the virtual representations may include certain device data and/or states of the connected devices 135-145 that can be manipulated by the device manager applications 122,124. One parameter is a virtual connectivity state (e.g., connection) to the actual device 135-145. The device manager application may change the connectivity state to the devices 135-145 as certain connection types (e.g., highest ranked) become available or unavailable. In one embodiment, the virtual devices are simple virtual devices that maintain statuses of supported connection types, but that fail to include other information of the devices 135-145.

In one embodiment, the virtual representations of the devices 135-145 in the device manager applications 122, 124 also may include numerous asynchronous receivers that are application modules each configured to listen for a different respective network change event and/or for network change events associated with a particular connection type. The computing device 105 may include numerous radios (e.g., cellular, LAN, Bluetooth, etc.). Based on the connection types supported by the connected devices 135-145 and/or the computing devices 105-110, each virtual representation of the devices 135-145 may include a different asynchronous receiver that listens for network change events from the radios of the supported connection types.

When any network change event is received by a computing device 105-110, the device manager applications 122, 124 may determine the highest ranked connection type for connecting to a device 145-145. This may include determining whether the connection type included in the network change event is or was the highest ranked available connection type for that device 135-145. The device manager applications 122, 124 may maintain a ranked list of connection types for each device 135-145 and may identify the available connection types in the ranked list. In some embodiments, the ranked list of connection types includes a preconfigured ranking of a LAN having a highest rank, a Bluetooth connection having a second highest rank, a WAN connection (e.g., web socket, HTTP) to the WAN accessible service 130 having a third highest ranking, and a cellular connection having a fourth highest rank. It should be understood that the connection types may be ranked in various different orders.

If the connection type included in the network change event matches the highest ranked available connection type in the ranked list and the network change event was an indication of the availability of a connection type, the device manager application 122, 124 may establish a connection with a device using the highest ranked available connection type that became available. If the connection type included in the network change event is not the highest ranked available connection type, the device manager application 122, 124 may maintain the current connection with the device. If the connection type included in the network change event matches the highest ranked available connection type in the ranked list and the network change event was an indication of the loss of availability of a connection type, the device manager application 122, 124 may establish a connection with a device using the next highest ranked available connection type since the connection type that was previously ranked the highest became unavailable.

In some instances, the computing devices 105, 110 may select to connect to the embedded systems 150-160 via the WAN 170 when it is the highest ranked available connection. While computing devices 105, 110 are connected to WAN 170, the device manager application 122, 124 may establish a session with the WAN accessible service 130 for each connected device 135-145 (e.g., via the virtual representation of the devices). The WAN accessible service 130 may provide an interface for indirectly controlling and monitoring the devices 135-140 using the remote control application 115 and 120. If a user desires to change a state of a device, the user may issue a command via the remote control application, and that command may be sent to the WAN accessible service 130. The WAN accessible service 130 may then forward the command on to the appropriate embedded system. Additionally, when the WAN accessible service 130 received updated state information for a device from an embedded system, the WAN accessible service 130 may forward the state information on to the remote control application. This may enable users to connect to and control the devices 135-145 from anywhere they have access to the Internet.

When a computing device 105, 110 or the devices 135-145 enters a range of a particular connection type (e.g., LAN 165), the device manager applications 122, 124 may detect one or more network change events including the availability of that particular connection type. The device manager applications 122, 124 may determine the highest ranked available connection type and determine whether the highest ranked available connection type is the same as the connection type included in the network change events. If the connection types match, the device manager application 122, 124 may establish a new connection to one or more embedded systems 150-160 using the particular connection type that became available. In some embodiments, the computing device 105, 110 may maintain a WAN connection while also being connected to the embedded systems 150-160 via another connection type (e.g., via the LAN 165, Bluetooth, Zigbee, cellular network, etc.). Thus, in case the other connection fails, the computing devices 105, 110 may maintain communication via the WAN connection. Further, while the computing device 105, 110 is connected via the other connection type 165, it may maintain a session with, and control, one or more embedded systems 150-160 even in the absence of a connection to WAN 170 (e.g., if LAN 165 loses a broadband Internet connection). Computing devices 105, 110 may also maintain multiple connections using other combinations of connection types (e.g., Bluetooth and LAN, Zigbee and LAN, etc.).

In an example, computing device 105 is shown as originally being connected to WAN 170, and then moving 108 to an area in which it can connect to LAN 165. The device manager application 122 may detect a network change event indicating that the LAN 165 is an available connection type for one or more of the devices 135-145. Responsive to the device manager application 122 determining that the LAN 165 is the highest ranked available connection type for the one or more devices 135-145, the device manager application 122 may establish a connection to the devices 135-145 via the LAN 165 even if the computing device 105 is already connected to the devices via the WAN 170. Once a direct LAN session is established between device manager application 122 and an embedded system, remote control application 115 may send commands directly to the embedded system and receive status updates directly from the embedded system without using the WAN accessible service 130 as an intermediary. Such direct connection provides a low latency (e.g., near instantaneous) communication between the remote control application 115 and the embedded systems 150-160. Accordingly, the embedded system may respond to and execute user commands without any user perceptible delay.

When a computing device 105, 110 becomes disconnected from the LAN 165, the device manager application 122, 124 may receive one or more network change events. For example, the network change events may indicate that the LAN 165 is no longer available. The device manager application 122, 124 may determine a new highest ranked available connection type (e.g., the WAN 170). The device manager application 122, 124 may automatically establish a connection with the embedded systems 150-160 via new highest ranked connection type (e.g., via the WAN 170). For example, if the computing device is a mobile phone, then the computing device may connect to the LAN 165 using a WiFi radio. Once the computing device goes out of range of the LAN 165, the computing device may connect to WAN 170 and WAN accessible service 130 through a connection with a wireless carrier system (e.g., though a global system for mobile communications (GSM), code division multiple access (CDMA), wideband code division multiple access (WCDMA), time division multiple access (TDMA), universal mobile telecommunications system (UMTS), long term evolution (LTE), worldwide interoperability for microwave access (WiMAX) or other wireless communication protocol connection). Accordingly, the device manager application 122 may automatically select an optimal connection type for communicating with the embedded systems 150-160 based on network change events and the highest ranked available connection types, and then establish an appropriate session for the determined connection type. Such connection establishment and transition between connections and sessions may be performed automatically (without user interaction) by the device manager application 122, 124, and may be transparent to the user and/or the remote control applications 115, 120.

Figure 2A:
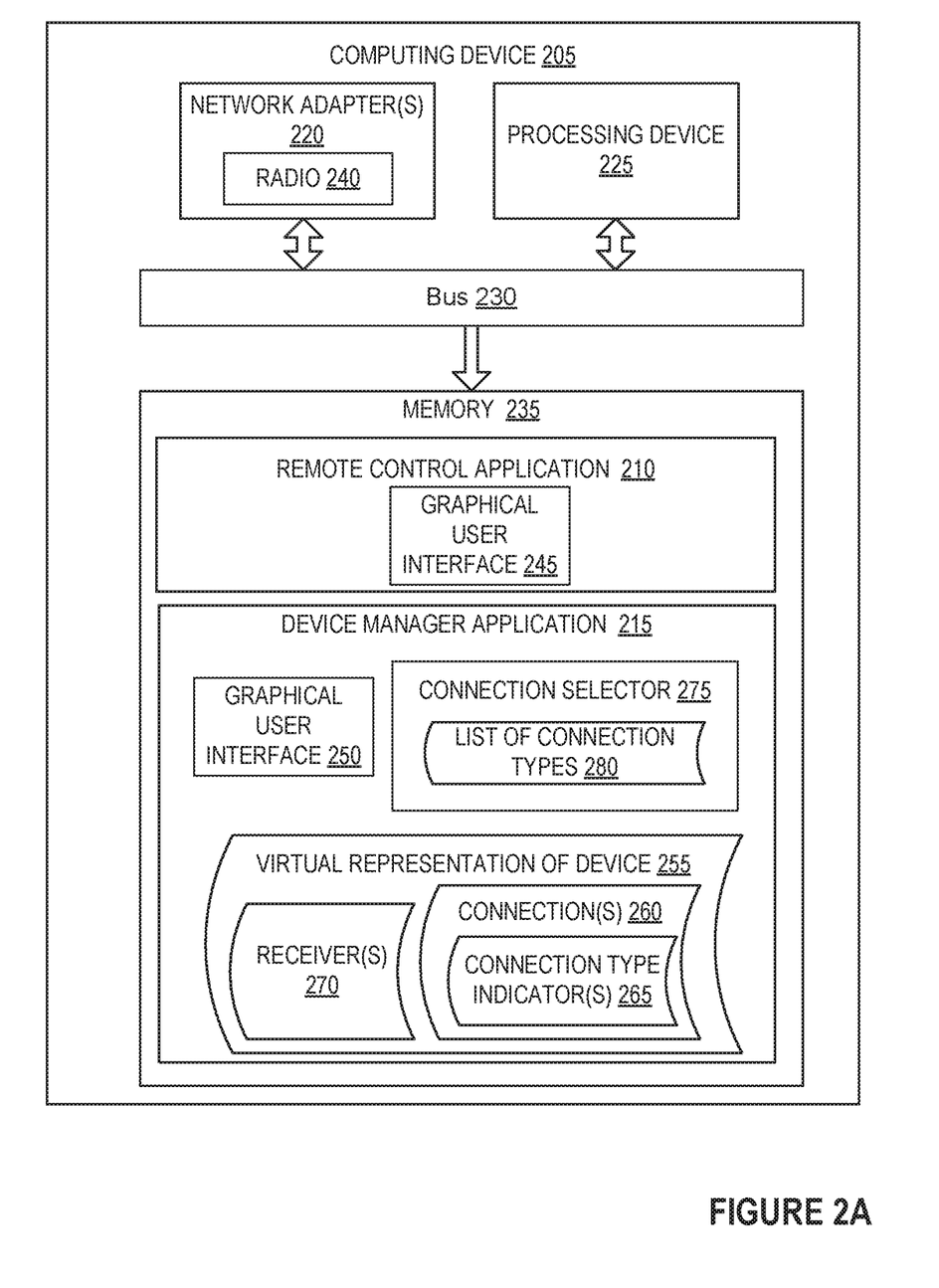
FIG. 2A is a block diagram of an example computing device having a device manager application.

FIG. 2A is a block diagram of an example computing device 205 having a remote control application 210 and a device manager application 215, in accordance with one embodiment. The computing device may include any of the aforementioned types of computing devices, and in one embodiment corresponds to a computing device 105, 110 of FIG. 1. In one embodiment, the computing device 205 includes a network adapter 220, a processing device 225, a bus 230, and a memory 235. The network adapter 220, the processing device 225, and the memory 235 may be communicatively coupled via the bus 230. The memory 235 may store data and computer instructions that, when executed by the processing device 225, cause the processing device 225 to perform one or more operations. The computing device 205 may also include numerous other components that are not shown herein. Examples of such additional components may include a display, a power supply, input/output ports, light emitting diodes (LEDs), fuses, digital to analog (D/A) converters, analog to digital (A/D) converters, field programmable gate arrays (FPGAs), application specific integrated circuits (ASICs), and so on.

Figure 7:
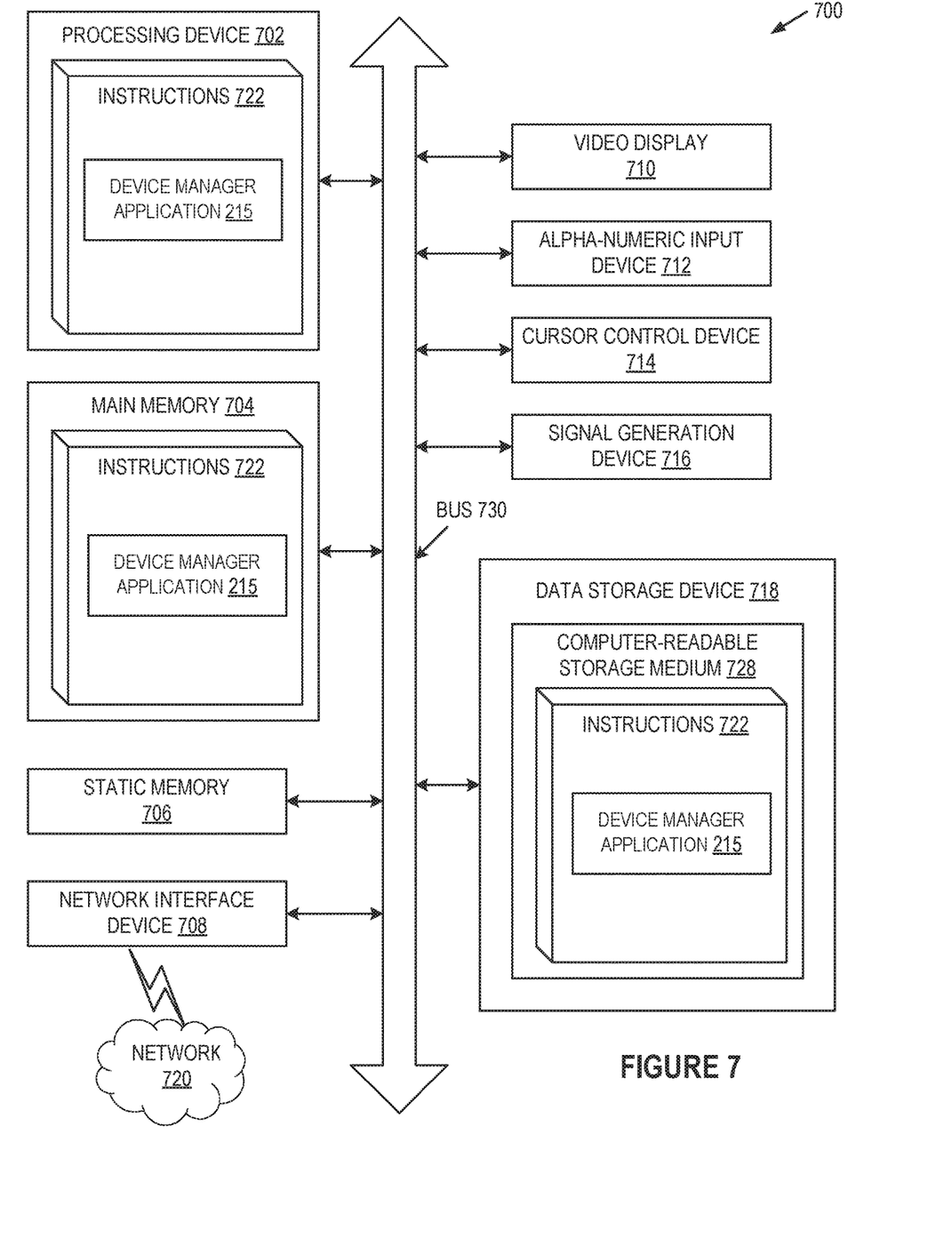
FIG. 7 illustrates a block diagram of one embodiment of a computing device.

The processing device may be any type of processing device discussed herein (e.g., with reference to FIG. 7). The memory 235 may include random access memory (RAM), read only memory (ROM), one time programmable (OTP) ROM, Flash (e.g., NOR Flash), or other types of memory. The memory 235 may additionally include a device state for the devices associated with the remote control application 210. The device state may include a present device state, historical device state, and/or changes made to the device state over a particular period.

The network adapter 220 may be a wired network adapter (e.g., an Ethernet adapter) or a wireless network adapter (e.g., a WiFi adapter or other wireless local area network (WLAN) adapter). Network adapter 220 may also be configured to provide connection to a network or other devices using Zigbee, PLC, Bluetooth, 6LowPAN, or other communication protocols. Network adapter 220 may receive notifications and other messages from a WAN accessible service and/or remote control applications. Network adapter 220 may additionally send outgoing messages to the WAN accessible service and/or to remote control applications.

The network adapter 220 may include one or more radios 240. Additionally or alternatively, computing device 205 may include multiple different network adapters, where each network adapter 220 supports a particular connection type (or multiple connection types). There may be a separate radio for each type of connection type that is supported by the computing device 205. For example, the radios 240 may include a Bluetooth radio, a cellular radio, a WiFi radio, a WAN radio, a Zigbee radio, or any suitable radio for the connection types supported by the computing device 205. Each radio may receive different messages formatted according to a communication protocol of the connection type associated with the respective radios. The messages may be or include network change events. As discussed below, the different messages may be parsed by the device manager application 215 to identify a connection type of the network change event. Alternatively, the connection type may be known a priori based on the network adapter from which the message was received, and the known connection type and/or network adapter 220 may be used to determine the parsing rules to parse the message.

The remote control application 210 and the device manager application 215 may be a program, plug-in, or library implemented by computer instructions stored in the memory 235. The processing device 225 may execute the remote control application 210 and the device manager application 215. The remote control application 210 and the device manager application 215 may be programmed to run on various operating systems, such as Windows® operating systems, Unix® operating systems, iOS® operating systems, Android® operating systems and Java® operating systems to name a few. The remote control application 210 and/or the device manager application 215 may also be configured as firmware, or as hardware, or as some combination of software, firmware and/or hardware.

In one embodiment, the remote control application 210 and/or the device manager application 215 may include a graphical user interface (GUI) 245, 250. The GUI 245 of the remote control application 210 may enable users to interact with and control connected devices in an intuitive and user-friendly manner. The GUI 245 of the remote control application 210 may provide a collection of graphical icons, visual indicators, buttons, toggles, sliders, and so forth that represent states and values of different parameters for the devices as well as controls for changing those states and values. A user may interact with the GUI 245 to cause the remote control application 210 to generate notifications, commands, property updates and other messages for the devices represented in the GUI 245. The GUI 250 of the device manager application 215 may enable a user to configure the connection types for certain devices and/or to rank connection types. Further, the GUI 250 of the device manager application 215 may display each device that is connected to the computing device 205 and the current connection type(s) used in the connection(s) with each of the devices.

The remote control application 210 may also have access to device data, which may include a device ID for a device that the remote control application 210 is registered with, a last known IP address of the device and a last known device state of the device. In one embodiment, the device ID includes a media access control (MAC) address of the embedded system. Alternatively, the device ID may be a unique identifier assigned to the embedded system (or to a communication module in the embedded system) that is separate from the MAC address.

When the remote control application 210 is logged into a user account that is registered with a device including an embedded system, a virtual representation of the device 255 may be generated by the device manager application 215. The virtual representation of the device 255 may include the device data about the connected devices that is accessible to the remote control application 210. Additionally, or alternatively, the virtual representation of the device 255 may include one or more connections 260 to the device associated with the virtual representation. Each of the one or more connections 260 may include a connection type indicator 265. The connection type indicators may indicate for a particular connection type whether that connection type is available or unavailable for connection to the device.

The virtual representation of the device 255 may also include one or more receivers 270. The receiver 270 may be asynchronous in that it just detects incoming messages. Each receiver 270 included in the virtual representation of the device 255 may be configured to listen for a particular network change event received via the different radios 240. That is, there may be a separate receiver 270 setup to listen for network change events for each connection type supported by the connected device.

The device manager application 215 may also include a connection selector 275 that selects a particular connection type and establishes a connection 260 having the connection type with the connected device via the virtual representation of the device 255. In one embodiment, the receiver 270 may detect a network change event received by the radio 240, and the connection selector 275 may identify an available connection type having a highest rank in a list of connection types 280. Then the connection selector 275 may establish a connection 260 with the device where the connection 260 includes the available connection type having the highest rank. The computing device 205 may use the appropriate network adapter 220 to communicate with the device using the selected connection type.

The receivers 270 may detect network change events for different connection types as the computing device 205 running the device manager application 215 changes locations or the device connected to the computing device 205 changes locations. Network change events may also occur, for example, if a network outage occurs for a LAN or WAN, if a particular radio 240 of the computing device 205 is turned off, if a streaming service becomes unavailable, if another WAN accessible service becomes unavailable, and so on. For example, if a LAN connection type has been selected for an established connection 260 and a better connection type (e.g., Bluetooth) becomes available, the receivers 270 may receive one or more network change events indicating such. The connection selector 275 may determine that the better connection type associated with the network change event is now the highest ranked available connection type in the list of connection types 280 and establish a new connection with the better connection type.

If a LAN connection type is selected for communication with a device by the connection selector 275, the device manager application 215 establishes a direct LAN connection and session with the embedded system of the device. If a WAN connection type has been selected for communication with a device by the connection selector 275, a connection 260 to a WAN accessible service may be established. The computing device 205 may provide credentials of a user and/or of the remote control application 210 to the WAN accessible service. Responsive to receiving the proper credentials, the WAN accessible service may establish a session with the device manager application 215. In one embodiment, secure sockets layer (SSL) or other security protocols are used for the secure session. Once the session is established, the WAN accessible service may provide remote control application 210 with an updated IP address and/or device state of the device.

The device manager application 215 may have its own hypertext transfer protocol (HTTP) session and may receive updates for multiple devices (e.g., every device owned by a user). The HTTP session may be a particular connection type (e.g., that provides a stream of information). Further, if one remote control application 210 is controlling two devices, for example, then the device manager application 215 may include two different receivers 270 for a particular connection type (e.g., LAN) if the devices are of a different type. If the devices are of the same type, then a single receiver 270 may be instantiated for both devices.

Figure 2B:
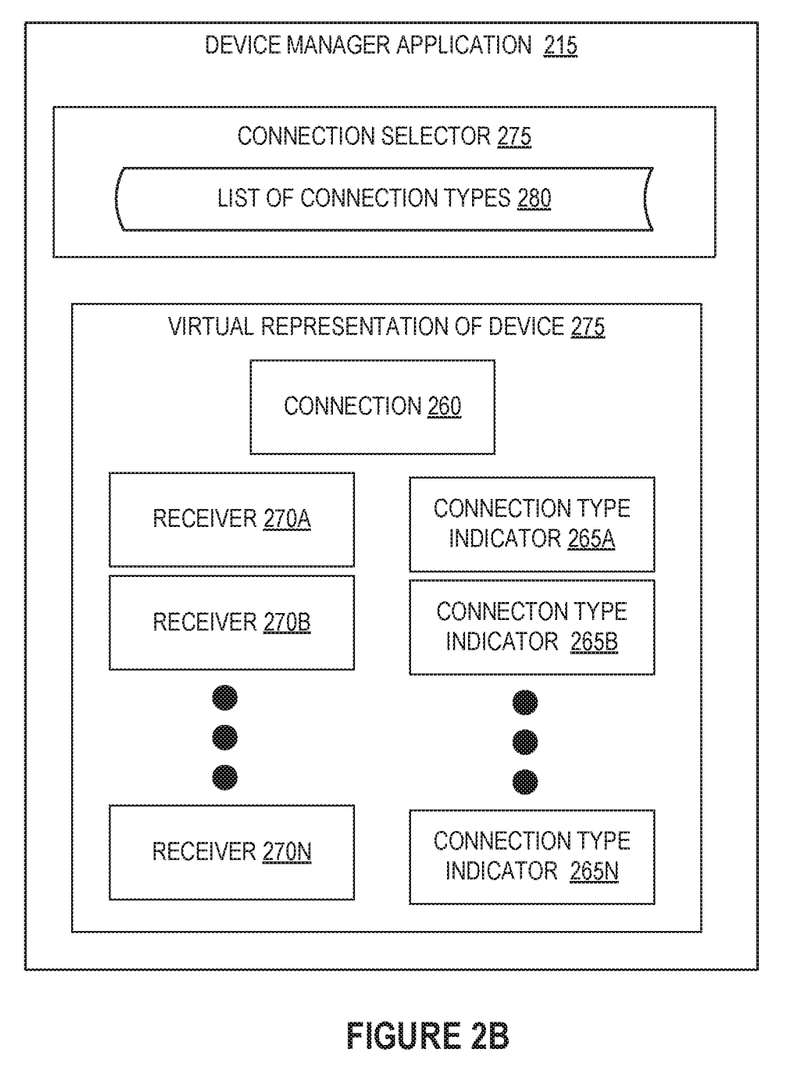
FIG. 2B is a block diagram of an example device manager application.

FIG. 2B is a block diagram of an example device manager application 215. The device manager application 215 may be executed by a processing device of the computing device 205. As discussed above, the device manager application 215 includes the connection selector 275 that selects the highest ranked available connection types in the list of connection types 280 for each device. Although one list of connection types 280 is depicted, it should be understood that a separate list of connection types 280 may be maintained for each different device that is connected to the computing device. The lists may include the connection types supported by the particular device ordered by ranking. For example, one device may have a ranked list of LAN as the highest ranked, Bluetooth as the next highest ranked, and WAN as the third highest ranked. Another device may have a ranked list of Zigbee as the highest ranked and LAN as the next highest ranked.

Additionally, the device manager application 215 includes the virtual representation of the device 275. Although one virtual representation of the device 275 is depicted, it should be understood that a separate virtual representation may be generated and maintained for each device connected to the computing device 205. The device manager application 205 may use the virtual representation of the device 275 to manage the connection 260 between the computing device 205 and the physical device represented by the virtual representation.

In one embodiment, any suitable number of receivers 270A, 270B, 270N may be instantiated for each different connection type supported by the device. The receivers 270A, 270B, 270N may be associated with the virtual representation of the device 275. For example, receiver 270A may be configured to detect network change events for a first connection type (e.g., LAN), receiver 270B may be configured to detect network change events for a second connection type (e.g., WAN), and receive 270N may be configured to detect network change events for an Nth connection type (e.g., Bluetooth).

The virtual representation of the device 275 may also include any suitable number of associated connection type indicators 265A, 265B, 265N. The connection type indicators 265A, 265B, 265N may indicate for a particular connection type whether that connection type is available or unavailable for connection to the device. For example, connection type indicator 265A may indicate that a first connection type (e.g., LAN) is available or unavailable, indicator 265B may indicate that a second connection type (e.g., WAN) is available or unavailable, and indicator 265N may indicate that an Nth connection type (e.g., Zigbee) is available or unavailable. The connection type indicators 265A, 265B, 265N may be updated dynamically based on the network change events detected by the receiver 270A, 270B, 270N. As the connection type indicators 265A, 265B, 265N are updated and connection types become available or unavailable, the connection selector 275 may inspect the list of connection types 280 to determine which connection type to select and establish with the device.

The device manager application 215 and the available connection types are transparent to the remote control application 210. The remote control application 210 is unaware to how the computing device 205 is connected to the remote device. Further, the remote control application 210 is also not aware when existing connections are dropped and new connections with different connection types are established. In one embodiment, the remote control application 210 may just be aware of whether or not there is a connection to the device associated with the remote control application 210.

FIGS. 3-6 are flow diagrams showing various methods related to establishing a connection with an embedded system and of communicating with the embedded system. The methods may be performed by a processing logic that may comprise hardware (e.g., circuitry, dedicated logic, programmable logic, microcode, etc.), software (e.g., instructions run on a processing device to perform hardware simulation), or a combination thereof. In one embodiment, at least some operations of the methods are performed by a computing device executing a device manager application, such as device manager application 215 of FIG. 2.

Figure 3:
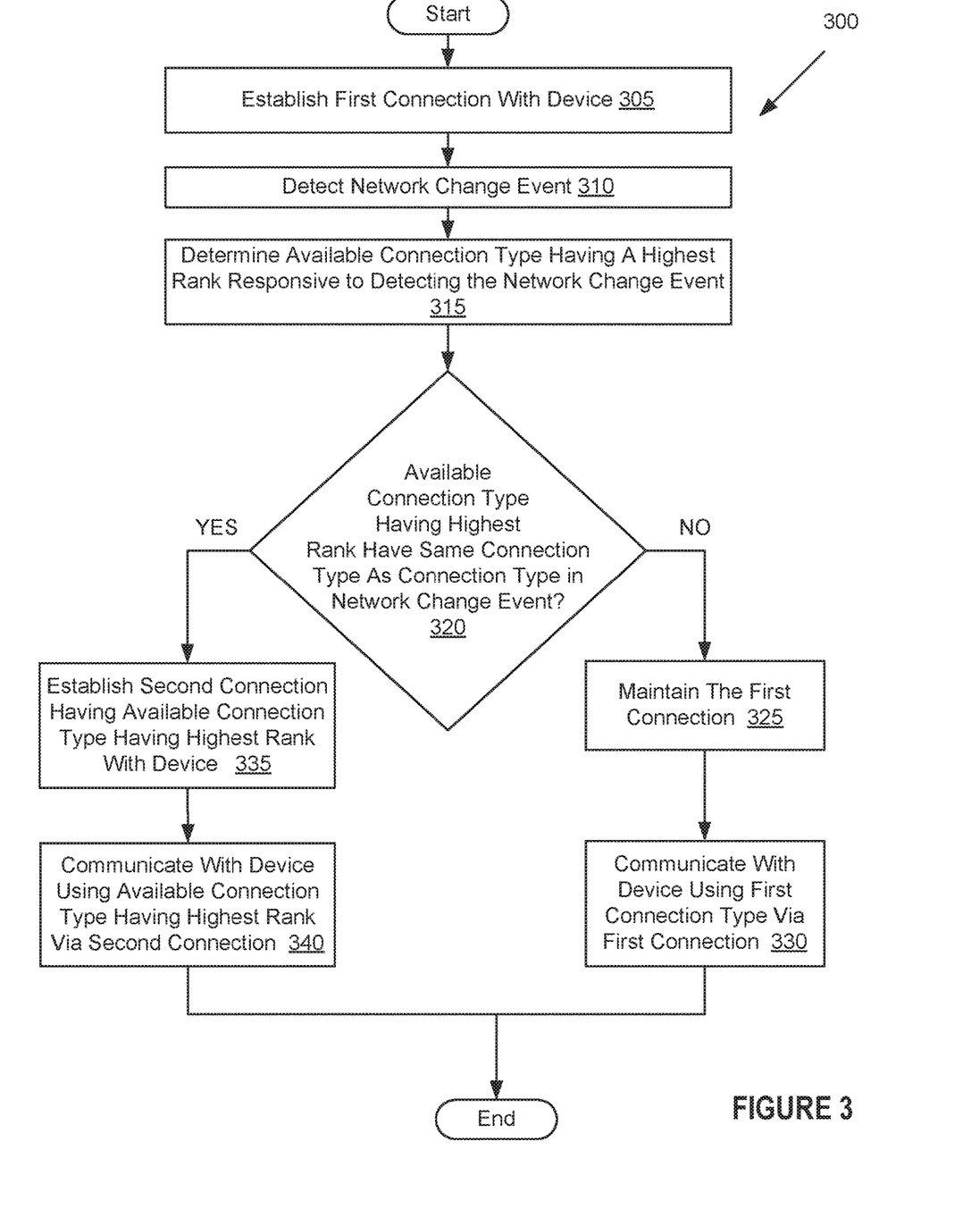
FIG. 3 is a flow chart of an example method of, in response to a network change event, establishing a connection to a device where the connection includes an available connection type having a highest rank.

FIG. 3 is a flow chart of an example method 300 of, in response to a network change event, establishing a connection to a device where the connection includes an available connection type having a highest rank. At block 305, processing logic establishes a first connection with a device. The device may include an embedded system with which a connection is established. The first connection may include a first connection type (e.g., LAN, WAN, Bluetooth, Zigbee, etc.). In some embodiments, processing logic may communicate with the second device via the first connection once the first connection is established. One embodiment of generating a virtual representation of the device and instantiating receivers to manage the connection with the device is set forth below with reference to FIG. 4.

At block 310, processing logic detects a network change event. The network change event includes a change in connection status of at least one of the first connection type or a second connection type (e.g., LAN, WAN, Bluetooth, Zigbee). The second connection type is different than the first connection type. The change in connection status may include the second connection type becoming available or the first connection type becoming unavailable. In some embodiments, the network change event may include a particular message format for a communication protocol associated with the connection type.

At block 315, processing logic determines an available connection type having a highest rank responsive to detecting the network change event. The processing logic may use the list of connection types 210 that ranks the connection types supported by the connected device. It should be noted that there may be different lists for different devices maintained by the device manager application 215. The processing logic may identify positions of one or more of the available connection types in the list of connection types to identify the available connection type having the highest rank. The connection types included in the list may include LAN, Bluetooth, WAN, Zigbee, cellular, a streaming service, and the like.

At block 320, processing logic determines whether the available connection type having a highest rank is the same as the connection type of the current connection to a device. For example, processing logic may determine whether the included connection type in the detected network change event is the highest available connection type. If the current connection has a connection type that is the highest ranked connection type (e.g., the connection type included in the network change event is different than the available connection type having a highest rank), then at block 325, processing logic maintains the first connection. Further, at block 330, processing logic communicates with the device using the first connection type via the first connection.

If at block 320 it is determined that the current connection type is not the highest ranked available connection type (e.g., the connection type associated with the network change event is the same as the available connection type having a highest rank), then at block 335, processing logic establishes a second connection with the available connection type having the highest rank with the device. For example, if the network change event indicates the availability of a connection type that has a higher rank than a connection type associated with the first connection, then the method may proceed to block 335. One embodiment of handling the first connection after the second connection is established is set forth below with reference to FIG. 6. Further, at block 340, processing logic communicates with the device using the available connection type having the highest rank via the second connection. One embodiment of detecting additional network change events and establishing a connection having a highest ranked available connection type is set forth below with reference to FIG. 5.

Figure 4:
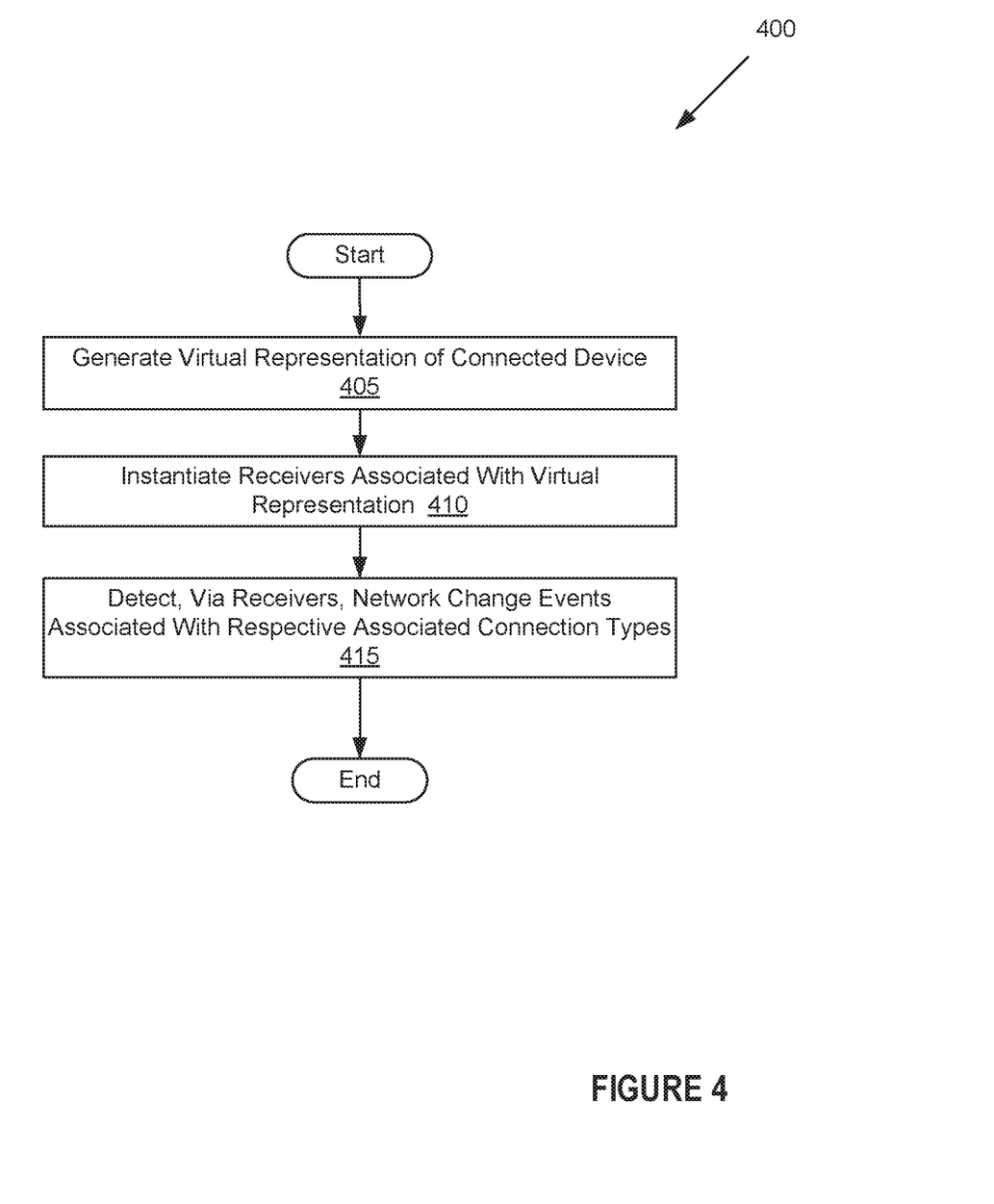
FIG. 4 is a flow chart of an example method of instantiating receivers for a virtual representation of a device.

FIG. 4 is a flow chart of an example method 400 of instantiating receivers for a virtual representation of a device. At block 405, processing logic may generate a virtual representation of a connected device (e.g., of a device with an embedded system that is connection to a WAN accessible service). The virtual representation may include a set of connection type indicators. Each of the connection type indicators may indicate for a particular connection type whether that connection type is an available connection type or an unavailable connection type for connection to the device. Each connection type indicator may be associated with a different connection type. Further, the virtual representation of the connected device may include the device state and any suitable device data for the connected device. Additionally, the virtual representation of the connected device may indicate a particular connection type that is used for a current active connection with the connected device.

At block 410, processing logic may instantiate one or more receivers associated with the virtual representation. Each of the receivers is associated with a connection type and is to detect network change events associated with the respective connection type. The receivers may be asynchronous receivers. The network change events may be received via the radio(s) 240 of the network adapter(s) 220. Once instantiated, the receivers may listen to the radios until network change events are detected and may continue to listen for the lifetime of the virtual representation of the device.

At block 415, processing logic detects, via the receiver, a network change event associated with the respective associated connection types. Processing logic may proceed with determining whether the connection type in the network change event is the highest ranked available connection type and may establish a connection with the highest ranked available connection type as explained above with reference to FIG. 3.

Figure 5:
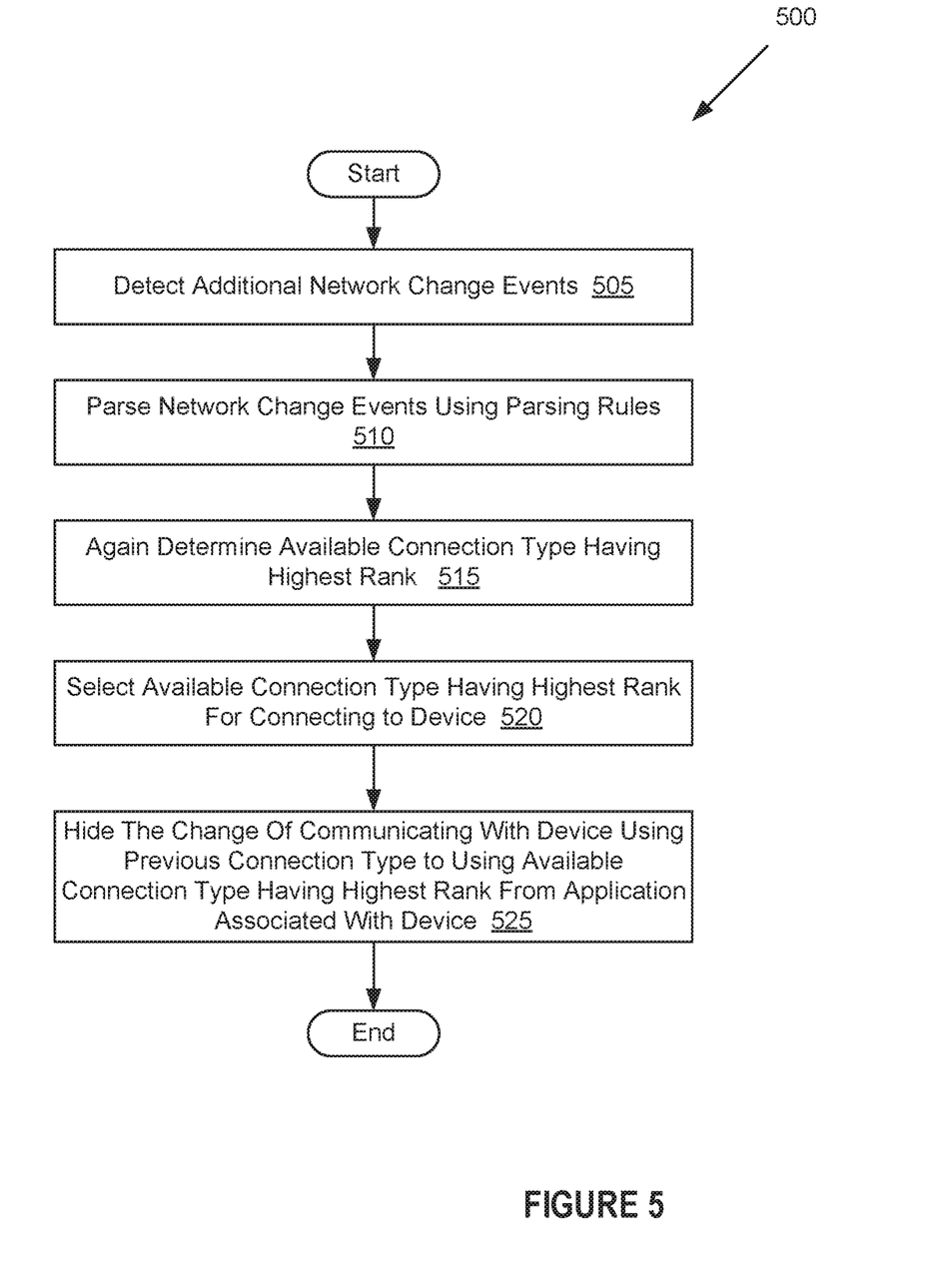
FIG. 5 is a flow chart of an example method of, in response to additional network change events, establishing a connection to a device where the connection includes an available connection type having a highest rank.

FIG. 5 is a flow chart of an example method 500 of, in response to additional network change events that occur after an initial network change event, establishing a connection to a device where the connection includes an available connection type having a highest rank. Method 500 may occur during or after the first connection and/or second connection being established as explained above with reference to FIG. 3.

At block 505, processing logic detects additional network change events. The receivers of the virtual representation of the device may detect the network change event associated with different connection types. Each network change event for different connection types may be sent as messages formatted for particular communication protocols associated with those particular connection types. For example, a first network change event may include a first message format (e.g., Bluetooth) and a second network change event may include a second message format (e.g., Zigbee).

Accordingly, at block 510, processing logic may parse the network change events using parsing rules. For example, processing logic may parse the first network change event using a first parsing rule and may parse the second network change event using the second parsing rule. The parsing rule to use for parsing a network change event may be determined based on the receiver that receives the network change event. Each receiver may be configured to parse received network change events using a particular parsing rule associated with the connection type associated with that receiver. Thus, the data included in the network change events may be normalized even if the messages have differing formats. The network change events may be parsed to identify the connection type and/or status of that connection type included in the particular network change event. Alternatively, the connection type may be known based on the receiver that received the network change event. The parsing rule may translate the desired information from the first format to another format readable by the device manager application.

At block 515, processing logic again determines an available connection type having a highest rank. The determination may be made in response to one of the receivers detecting the additional network change event. In some embodiments, the processing logic references the list of connection types for the device to determine the available connection type having the highest rank. At block 520, processing logic selects the available connection type having the highest rank for connecting to the device and establishes a new connection with the available connection type having the highest rank for communicating with the device.

At block 525, processing logic may hide the change of communicating with the device using the previous connection type to using the available connection type having the highest rank from a remote control application associated with the device that is executing on the device. That is, the change in connectivity is transparent to the remote control application. Such functionality may enable seamlessness of operation and enhanced user experience of the remote control application by benefiting from the highest ranked available connection type at any given point in time.

Figure 6:
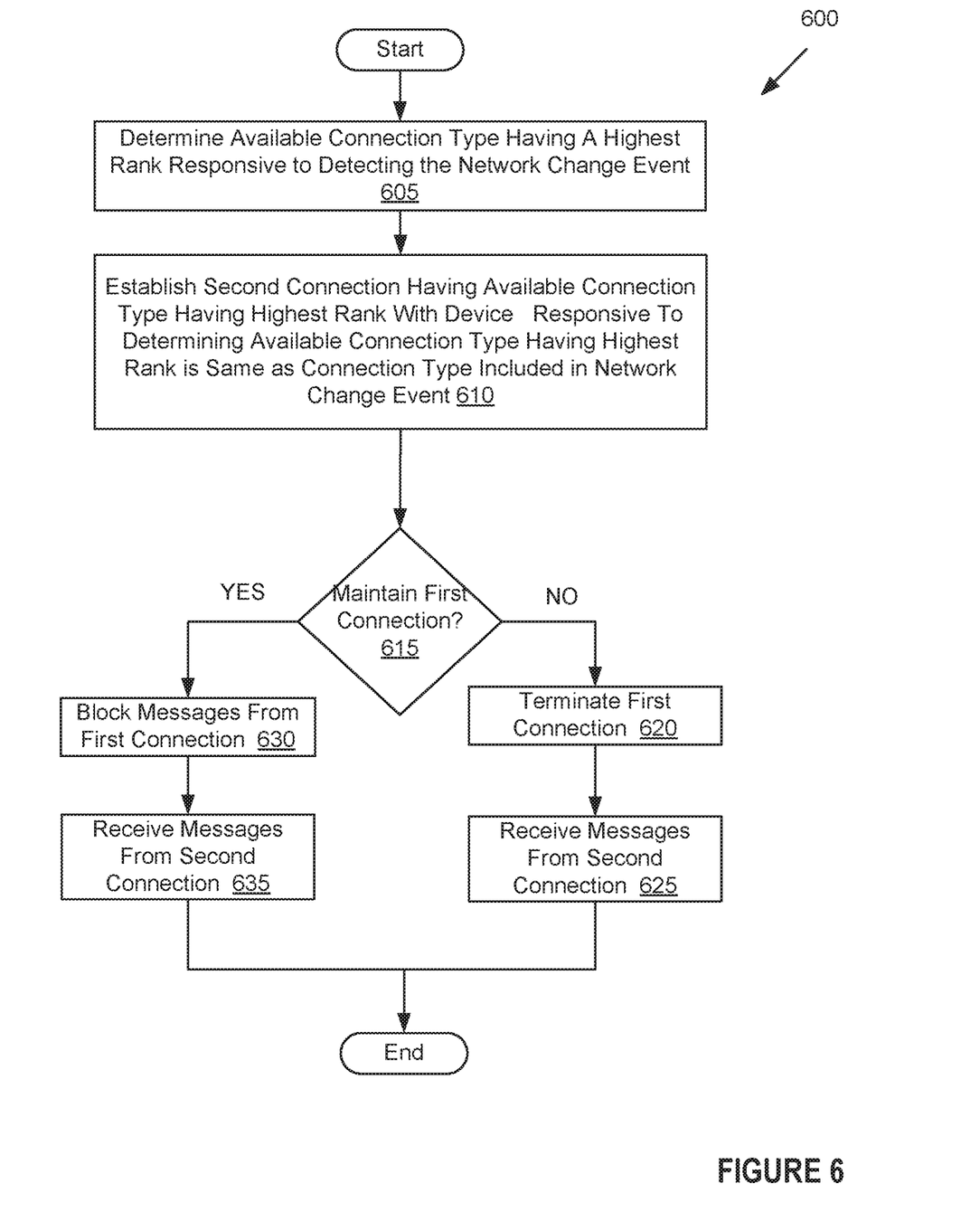
FIG. 6 is a flow chart of an example method of managing two connections to a device where the connections have different connection types.

FIG. 6 is a flow chart of an example method 600 of managing two connections to a device where the connections have different connection types. Method 600 may occur after a first connection having a first connection type is established by processing logic with the device as explained above with reference to FIG. 3.

Referring now to FIG. 6, at block 605, processing logic determines the available connection type having a highest rank responsive to detecting a network change event. At block 610, processing logic establishes a second connection with an available connection type having a highest rank with the device responsive to determining that the available connection type having the highest rank is or was the same as the connection type included in the network change event.

At block 615, processing logic determines whether to maintain the first connection having the first connection type. In some instances, such as when the first connection type is the WAN, it may be desirable to maintain the first connection in cases where the second connection might fail so there is no interruption of data delivery. As such, processing logic may determine to maintain the first connection and, at block 630, processing logic may block messages from the first connection. Processing logic may also block messages from being sent via the first connection. Further, at block 635, processing logic receives messages from the second connection.

In some instances, it may be undesirable to maintain the first connection. As such, processing logic may determine at block 615 to not maintain the first connection, and at block 620, processing logic terminates the first connection. Further, at block 625, processing logic may receive messages from the second connection with the available connection type having the highest rank.

FIG. 7 illustrates a diagrammatic representation of a machine in the example form of a computing device 700 within which a set of instructions, for causing the machine to perform any one or more of the methodologies discussed herein, may be executed. In alternative embodiments, the machine may be connected (e.g., networked) to other machines in a Local Area Network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The example computing device 700 includes a processing device 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a secondary memory (e.g., a data storage device 718), which communicate with each other via a bus 730.

Processing device 702 represents one or more general-purpose processors such as a microprocessor, central processing unit, or the like. More particularly, the processing device 702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. Processing device 702 is configured to execute the processing logic (instructions 722) for performing the operations and steps discussed herein.

The computing device 700 may further include a network interface device 708. The computing device 700 also may include a video display unit 710 (e.g., a liquid crystal display (LCD) or a cathode ray tube (CRT)), an alphanumeric input device 712 (e.g., a keyboard), a cursor control device 714 (e.g., a mouse), and a signal generation device 716 (e.g., a speaker).

The data storage device 718 may include a machine-readable storage medium (or more specifically a computer-readable storage medium) 728 on which is stored one or more sets of instructions 722 embodying any one or more of the methodologies or functions described herein. The instructions 722 may also reside, completely or at least partially, within the main memory 704 and/or within the processing device 702 during execution thereof by the computer system 700, the main memory 704 and the processing device 702 also constituting computer-readable storage media.

The computer-readable storage medium 728 may also be used to store a device manager application (as described with reference to FIGS. 2A and 2B), and/or a software library containing methods that call a device manager application. While the computer-readable storage medium 728 is shown in an example embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing or encoding a set of instructions for execution by the machine and that cause the machine to perform any one or more of the methodologies described herein. The term "computer-readable storage medium" shall accordingly be taken to include, but not be limited to, solid-state memories, and optical and magnetic media.

The modules, components and other features described herein (for example in relation to FIGS. 1, 2A, and 2B) can be implemented as discrete hardware components or integrated in the functionality of hardware components such as ASICS, FPGAs, DSPs or similar devices. In addition, the modules can be implemented as firmware or functional circuitry within hardware devices. Further, the modules can be implemented in any combination of hardware devices and software components, or only in software.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving", "connecting", "determining", "establishing", "communicating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the present invention also relate to an apparatus for performing the operations herein. This apparatus may be specially constructed for the discussed purposes, or it may comprise a general purpose computer system selectively programmed by a computer program stored in the computer system. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

It is to be understood that the above description is intended to be illustrative, and not restrictive. Many other embodiments will be apparent to those of skill in the art upon reading and understanding the above description. Although the present invention has been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A method comprising:
    establishing, by a processor of a first device, a first connection with a second device, the first connection comprising a first connection type;
    detecting, by the processor, a first network change event, the first network change event comprising a change in connection status of a second connection type, wherein the change in the connection status comprises a change in availability of the second connection type;
    determining an available connection type having a highest rank responsive to detecting the first network change event;
    determining whether the available connection type having the highest rank is the second connection type or a third connection type;
    in response to determining that the available connection type having the highest rank is the second connection type or the third connection type, establishing, by the processor, a second connection with the second device, the second connection comprising the available connection type having the highest rank; and
    communicating with the second device using the available connection type having the highest rank via the second connection.

2. The method of claim 1, further comprising:
    generating a virtual representation of the second device, wherein the virtual representation comprises a plurality of connection type indicators, each of the plurality of connection type indicators indicating for a particular connection type whether that connection type is an available connection type or an unavailable connection type for connection between the first device and the second device.

3. The method of claim 2, further comprising:
    instantiating a plurality of receivers associated with the virtual representation, wherein each of the plurality of receivers is associated with a connection type and is to detect network change events associated with the respective associated connection type.

4. The method of claim 1, further comprising:
    terminating the first connection having the first connection type in response to determining that the available connection type having the highest rank is the second connection type or the third connection type.

5. The method of claim 1, wherein the first connection type is maintained, and wherein messages from the first connection are blocked and messages from the second connection are allowed.

6. The method of claim 1, further comprising:
    detecting a second network change event, the second network change event being associated with the second connection type or the third connection type;
    determining the available connection type having the highest rank responsive to detecting the second network change event; and
    selecting the available connection type having the highest rank for connecting to the second device.

7. The method of claim 6, wherein the first network change event comprises a first message format and the second network change event comprises a second message format, the method further comprising:
    parsing the first network change event using a first parsing rule; and
    parsing the second network change event using a second parsing rule.

8. The method of claim 1, wherein determining the available connection type having the highest rank comprises identifying positions of one or more of the available connection types in a ranked list of connection types.

9. The method of claim 8, wherein the ranked list of connection types comprises a preconfigured ranking of a local area network (LAN) connection having a highest rank, a Bluetooth connection having a second highest rank, a wide area network (WAN) web socket connection to a streaming service having a third highest rank, and a cellular connection having a fourth highest rank.

10. The method of claim 1, further comprising:
    prior to detecting the first network change event, communicating with the second device using the first connection type via the first connection, wherein a change from communicating with the second device using the first connection type to communicating with the second device using the available connection type having the highest rank is hidden from an application associated with the second device that executes on the first device.

11. The method of claim 1, wherein the network change further comprises at least one of the second connection type becoming available or the first connection type becoming unavailable.

12. A computing device, comprising:
    an interface to connect to one or more devices; and
    a processor, connected with the interface, the processor to:
        establish, via the interface, a first connection with a first device of the one or more devices, the first connection comprising a first connection type;
        detect a network change event, the network change event comprising a change in connection status of a second connection type, wherein the change in the connection status comprises a change in availability of the second connection type;
        determine an available connection type having a highest rank responsive to detecting the network change event;

determine whether the available connection type having the highest rank is the second connection type or a third connection type;

in response to determining that the available connection type having the highest rank is the second connection type or the third connection type, establish a second connection with the first device, the second connection comprising the available connection type having the highest rank; and communicate with the first device using the available connection type having the highest rank via the second connection.

13. The device of claim 12, wherein the processor is further to:

in response to determining that the available connection type having the highest rank is the first connection type, maintain the first connection.

14. The device of claim 12, wherein the processor is further to:

generate a virtual representation of the first device, wherein the virtual representation comprises a plurality of connection type indicators, each of the plurality of connection type indicators indicating for a particular connection type whether that connection type is an available connection type or an unavailable connection type for connection between the computing device and the first device.

15. The device of claim 14, wherein the processor is further to:

instantiate a plurality of receivers associated with the virtual representation, wherein each of the plurality of receivers is associated with a connection type and is to detect network change events associated with the respective associated connection type.

16. The device of claim 12, wherein the processor is further to:

detect an additional network change event, the additional network change event being associated with the second connection type or the third connection type;

determine the available connection type having the highest rank responsive to detecting the additional network change event; and select the available connection type having the highest rank for connecting to the first device.

17. One or more tangible, non-transitory computer-readable media including instructions that, when executed by one or more processors of a first device, cause the one or more processors to:

establish, via an interface, a first connection with a second device, the first connection comprising a first connection type;

detect a network change event, the network change event comprising a change in connection status of a second connection type, wherein the change in the connection status comprises a change in availability of the second connection type;

determine an available connection type having a highest rank responsive to detecting the network change event;

determine whether the available connection type having the highest rank is the second connection type or a third connection type;

in response to determining that the available connection type having the highest rank is the second connection type or the third connection type, establish a second connection with the second device, the second connection comprising the available connection type having the highest rank; and communicate with the second device using the available connection type having the highest rank via the second connection.

18. The computer-readable media of claim 17, wherein the instructions further cause the one or more processors to:

in response to determining that the available connection type having the highest rank is the first connection type, maintain the first connection.

19. The computer-readable media of claim 17, wherein determining the available connection type having the highest rank comprises the one or more processors further to identify positions of one or more of the available connection types in a ranked list of connection types.

20. The computer-readable media of claim 17, wherein the instructions further cause the one or more processors to:

prior to detecting the network change event, communicate with the second device using the first connection type via the first connection, wherein a change from communicating with the second device using the first connection type to communicating with the second device using the available connection type having the highest rank is hidden from an application associated with the second device that executes on the first device.

* * * * *